(12) United States Patent
Chen (10) Patent No.: US 7,868,631 B2
(45) Date of Patent: Jan. 11, 2011

(54) SOLAR CELL TESTING APPARATUS

(75) Inventor: Yi-Chan Chen, Yunlin County (TW)

(73) Assignee: Industrial Technology Research Institute, Hsinchu (TW)

( * ) Notice: Subject to any disclaimer, the term of this patent is extended or adjusted under 35 U.S.C. 154(b) by 5 days.

(21) Appl. No.: 12/395,712

(22) Filed: Mar. 2, 2009

(65) Prior Publication Data

US 2009/0278546 A1 Nov. 12, 2009

(30) Foreign Application Priority Data

May 9, 2008 (TW) .............................. 97117190 A (51) Int. Cl.
G01R 31/302 (2006.01)
G01R 31/28 (2006.01)
(52) U.S. Cl. ..................... 324/752; 324/158.1
(58) Field of Classification Search ............. 324/158.4, 324/751–754, 765; 136/290
See application file for complete search history.

(56) References Cited

U.S. PATENT DOCUMENTS

| | | | | |
|---|---|---|---|---|
| 4,455,485 A | * | 6/1984 | Hosaka et al. | 250/234 |
| 4,712,063 A | | 12/1987 | Osterwald et al. | |
| 4,891,584 A | * | 1/1990 | Kamieniecki et al. | 324/752 |
| 5,493,236 A | * | 2/1996 | Ishii et al. | 324/752 |
| 6,639,421 B1 | | 10/2003 | Yoshino et al. | |
| 7,733,111 B1 | * | 6/2010 | Zhao et al. | 324/765 |
| 2002/0163323 A1 | * | 11/2002 | Kasai et al. | 323/284 |
| 2003/0222670 A1 | * | 12/2003 | Hamada | 324/765 |

FOREIGN PATENT DOCUMENTS

| | | |
|---|---|---|
| CN | 1140813 C | 3/2004 |
| CN | 1300597 C | 2/2007 |

OTHER PUBLICATIONS

"1st Office Action of China Counterpart Application" issued on Aug. 27, 2010, p. 1-p. 7, in which the listed references were cited.

* cited by examiner

*Primary Examiner*—Ha Tran T Nguyen
*Assistant Examiner*—Joshua Benitez
(74) *Attorney, Agent, or Firm*—Jianq Chyun IP Office (57) ABSTRACT

A solar cell testing apparatus including a stage, a movable chuck, a light source and a plurality of probes is provided. The movable chuck is disposed on the stage and capable of carrying a sample sheet to move. The sample sheet has a light incident side, a rear side opposite to the light incident side, and a plurality of electrodes disposed on the rear side. The light source is disposed above the stage and capable of providing testing light to the light incident side of the sample sheet. The probes are located on the rear side of the sample sheet and capable of contacting the electrodes of the sample sheet. The present invention not only can be used to test a substrate type solar cell, but also can be used to test a superstrate type solar cell.

23 Claims, 6 Drawing Sheets

SOLAR CELL TESTING APPARATUS

CROSS-REFERENCE TO RELATED APPLICATION

This application claims the priority benefit of Taiwan application serial no. 97117190, filed on May 9, 2008. The entirety of the above-mentioned patent application is hereby incorporated by reference herein and made a part of this specification.

BACKGROUND OF THE INVENTION

1. Field of the Invention

The present invention generally relates to a solar cell testing apparatus, in particular, to a solar cell testing apparatus for testing a solar cell immediately.

2. Description of Related Art

Solar energy is an inexhaustible energy free of pollution, so that the solar energy has always been the focus in this field, when encountering the current problems of the fossil energy, for example, pollution and energy shortage. Currently, the solar cell has become an important research issue, since the solar energy can be directly converted into an electric energy.

Recently, according to the structure, the solar cell is approximately divided into two types, namely, a substrate type solar cell with electrodes disposed on a light incident side, and a superstrate type solar cell with electrodes disposed on a rear side. Generally, a common testing apparatus used to test the performance of the solar cell as U.S. Pat. No. 4,712,063 "Method and apparatus for measuring areas of photoelectric cells and photoelectric cell performance parameters" and U.S. Pat. No. 6,639,421 "Measuring apparatus and method for measuring characteristic of solar cell" mentioned about that the testing apparatus includes a carrier platform, a light source, and a plurality of testing terminals. The carrier platform is used to carry the solar cell, and the light source is disposed on the carrier platform and used to provide testing light to the solar cell. In addition, pluralities of electrodes of the solar cell are coupled to the testing terminals via wires respectively, so as to test a current generated by the solar cell upon receiving the testing light.

However, in the mentioned testing manner, the solar cell should be packaged and the wires coupled to the electrodes of the solar cell should be exposed first. Therefore, the performance of the solar cell can be tested by coupling the terminals of the testing apparatus with exposed portions of the wires. As a result, it is quite difficult to test the solar cell by the existing testing apparatus, and once some defects of the solar cell are found after the test, it is not easy to make remedy.

SUMMARY OF THE INVENTION

Accordingly, the present invention is directed to a solar cell testing apparatus, suitable for quickly and simply testing performance of a superstrate type solar cell.

The present invention is further directed to a solar cell testing apparatus, which is compatible with the testing of both the superstrate type solar cell and the substrate type solar cell, and provides a quick and simple testing manner.

The present invention provides a solar cell testing apparatus, which includes a stage, a movable chuck, a light source, and a plurality of probes. The movable chuck is disposed on the stage and capable of carrying a sample sheet to move relative to the stage, wherein the sample sheet is capable of achieving an one-dimensional motion, a two-dimensional motion or a three-dimensional motion relative to the stage. The sample sheet has a light incident side, a rear side opposite to the light incident side, and a plurality of electrodes disposed on the rear side. The light source is disposed above the stage and capable of providing testing light to the light incident side of the sample sheet. The probes are located on the rear side of the sample sheet and capable of contacting the electrodes of the sample sheet.

In an embodiment of the present invention, the solar cell testing apparatus further comprises a moving platform. The moving platform is disposed on the stage and capable of carrying the probes to move relative to the sample sheet, wherein the moving platform is capable of achieving an one-dimensional motion, a two-dimensional motion or a three-dimensional motion relative to the sample sheet.

In an embodiment of the present invention, the solar cell testing apparatus further comprises a plurality of moving stations. The probes are respectively disposed on the moving platform via the movable stations, so as to enable the probes to move relative to the moving platform, wherein the movable stations are capable of achieving one-dimensional motions, two-dimensional motions or three-dimensional motions relative to the moving platform.

In an embodiment of the present invention, the probes are integrated on a probe card disposed on the moving platform.

In an embodiment of the present invention, the solar cell testing apparatus further comprises a mask. The mask is disposed on the light incident side of the sample sheet, and a partial area of the sample sheet is exposed by the mask. The probes contact the electrodes corresponding to the partial area of the sample sheet exposed by the mask, and the mask and the probes are moved synchronously.

In an embodiment of the present invention, the solar cell testing apparatus further comprises a temperature control device. The temperature control device is disposed on the stage and capable of maintaining an operating temperature of the sample sheet. The temperature control device includes a temperature sensor and a fan. The temperature sensor is coupled to the sample sheet and capable of measuring an operating temperature of the sample sheet. The fan is disposed around the sample sheet, coupled to the temperature sensor, and capable of adjusting the operating temperature of the sample sheet according to an operating temperature measured by the temperature sensor.

The present invention further provides a solar cell testing apparatus, which includes a stage, a movable chuck, a light source, a plurality of probes, and a moving platform. The movable chuck is disposed on the stage and capable of carrying a sample sheet to move relative to the stage, wherein the sample sheet is capable of achieving an one-dimensional motion, a two-dimensional motion or a three-dimensional motion relative to the stage. The sample sheet has a light incident side and a rear side opposite to each other. The light source is disposed above the stage and capable of providing testing light to the light incident side of the sample sheet. The probes are coupled to the sample sheet. The moving platform is disposed on the stage and capable of carrying the probes to move to contact the sample sheet from the light incident side or the rear side, wherein the moving platform is capable of achieving an one-dimensional motion, a two-dimensional motion or a three-dimensional motion relative to the sample sheet.

In an embodiment of the present invention, the sample sheet has a plurality of electrodes on the rear side, and the probes are coupled to the sample sheet via the electrodes.

In an embodiment of the present invention, the sample sheet has a plurality of electrodes on the light incident side, and the probes are coupled to the sample sheet via the electrodes.

In an embodiment of the present invention, the solar cell testing apparatus further comprises a plurality of moving stations. The probes are respectively disposed on the moving platform via the movable stations, so as to enable the probes to move relative to the moving platform, wherein the movable stations are capable of achieving one-dimensional motions, two-dimensional motions or three-dimensional motions relative to the moving platform.

In an embodiment of the present invention, the probes are integrated on a probe card disposed on the moving platform.

In an embodiment of the present invention, the solar cell testing apparatus further comprises a mask. The mask is disposed on the light incident side of the sample sheet, and a partial area of the sample sheet is exposed by the mask. The probes are coupled to the partial area of the sample sheet exposed by the mask, and the mask and the probes are moved synchronously.

In an embodiment of the present invention, the solar cell testing apparatus further comprises a temperature control device. The temperature control device is disposed on the stage and capable of maintaining an operating temperature of the sample sheet. The temperature control device includes a temperature sensor and a fan. The temperature sensor is coupled to the sample sheet and capable of measuring an operating temperature of the sample sheet. The fan is disposed around the sample sheet, coupled to the temperature sensor, and capable of adjusting the operating temperature of the sample sheet according to an operating temperature measured by the temperature sensor.

When the sample sheet is carried on the solar cell testing apparatus of the present invention, the light source is located on the light incident side of the sample sheet, and the probes are located on the rear side of the sample sheet and can contact the plurality of electrodes located on the rear side. Therefore, the solar cell testing apparatus of the present invention can be used to test a superstrate type solar cell before the superstrate type solar cell is packaged. In addition, the moving platform can also drive the probes to move to couple to the sample sheet from the light incident side of the sample sheet. Therefore, the solar cell testing apparatus of the present invention can be also used to test a substrate type solar cell before the substrate type solar cell is packaged.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

FIG. 4' is a top view of FIG. 4.

DESCRIPTION OF THE EMBODIMENTS

Reference will now be made in detail to the present embodiments of the invention, examples of which are illustrated in the accompanying drawings. Wherever possible, the same reference numbers are used in the drawings and the description to refer to the same or like parts.

Figure 1:
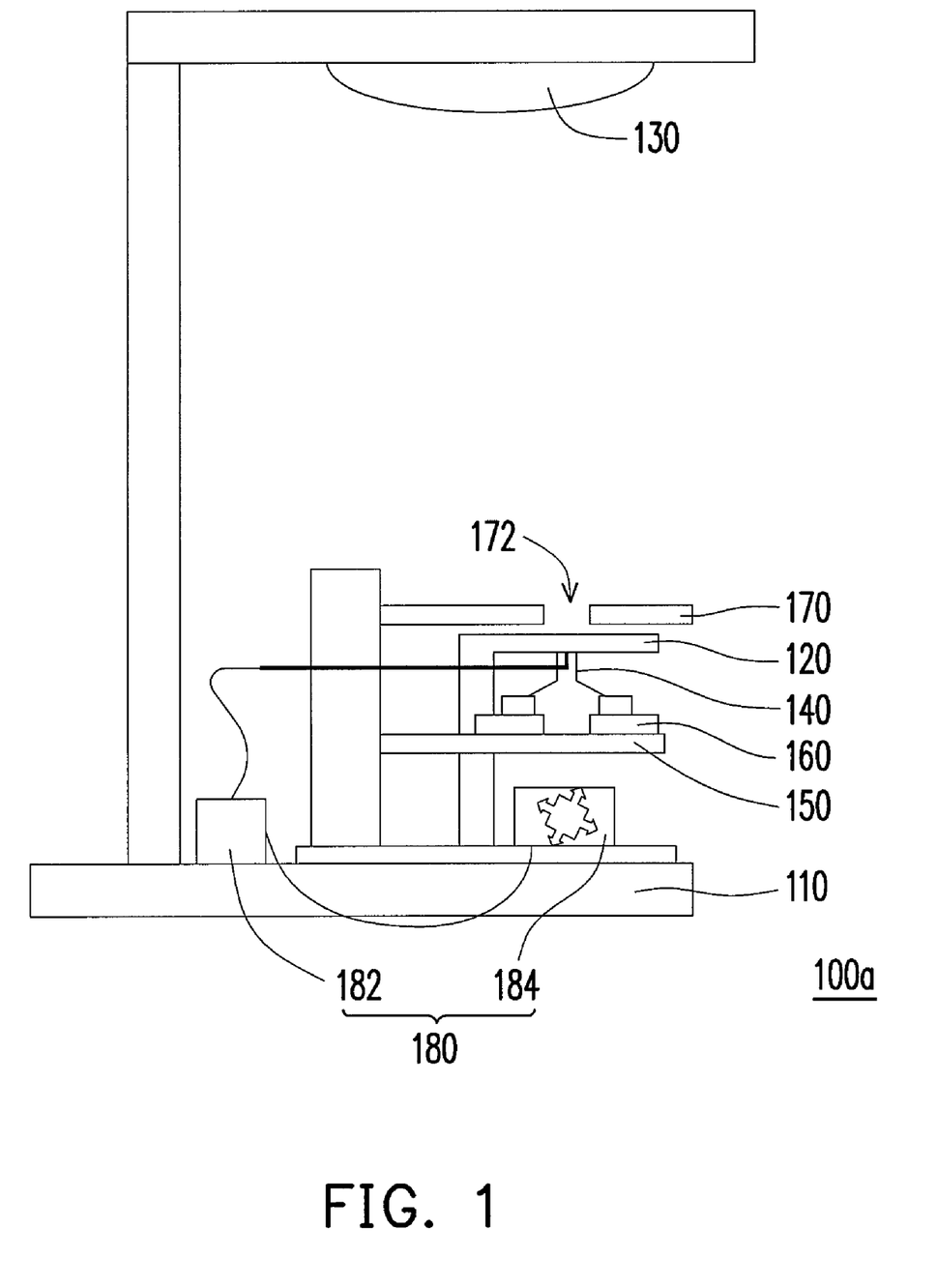
FIG. 1 is a schematic view of testing a sample sheet by a solar cell testing apparatus according to an embodiment of the present invention.
Figure 2:
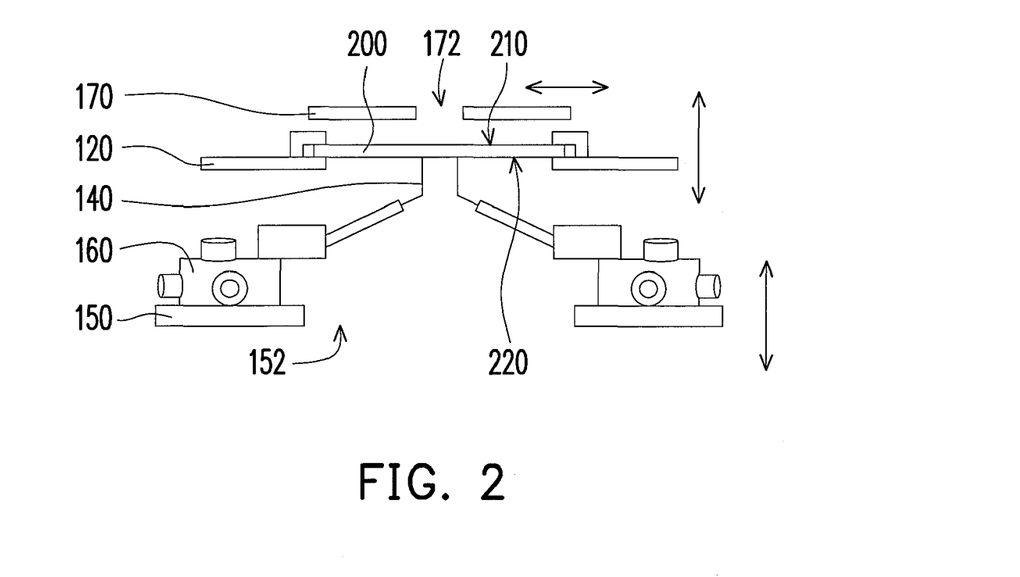
FIG. 2 is a right side view of FIG. 1.
Figure 3:
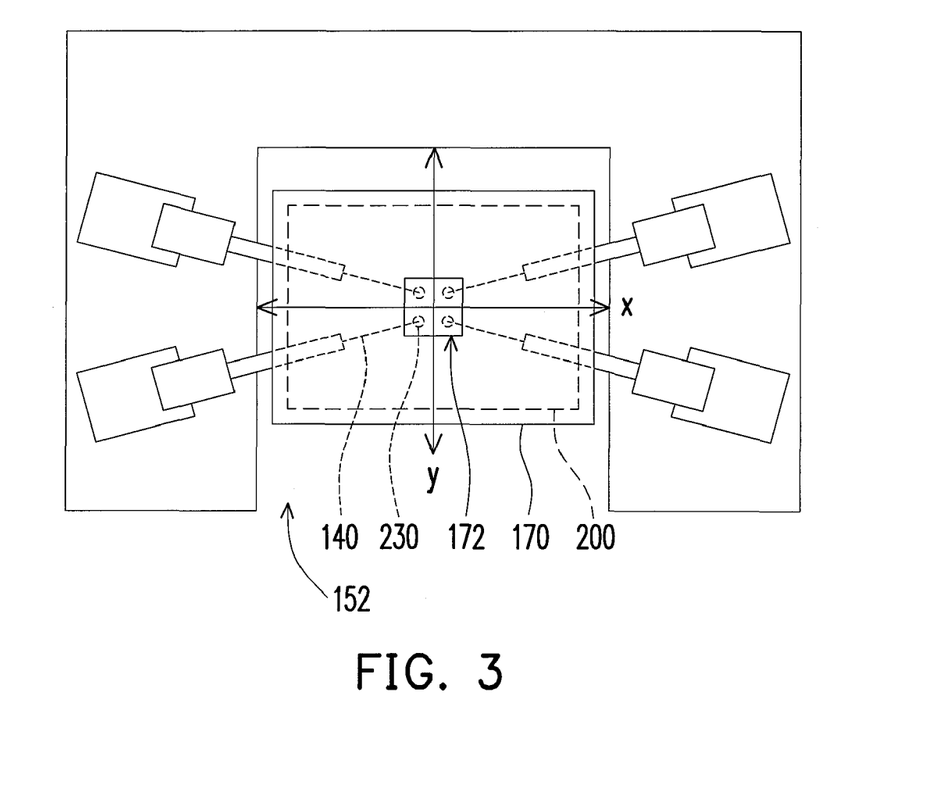
FIG. 3 is a top view of FIG. 2.

FIG. 1 is a schematic view of testing a sample sheet by a solar cell testing apparatus according to an embodiment of the present invention, FIG. 2 is a right side view of FIG. 1, and FIG. 3 is a top view of FIG. 2. In order to simplify the drawings, a stage, a light source, and a control device in FIG. 1 are omitted in FIG. 2 and the drawing is slightly enlarged, and a movable chuck in FIG. 2 is omitted in FIG. 3.

Referring to FIGS. 1 to 3, a solar cell testing apparatus 100a is used to test a sample sheet 200. In this embodiment, the sample sheet 200 is, for example, a superstrate type solar cell formed by, for example, a plurality of cell units. Furthermore, the sample sheet 200 has a light incident side 210, a rear side 220, and a plurality of electrodes 230, wherein the light incident side 210 is opposite to the rear side 220, and the electrodes 230 are located on the rear side 220.

The solar cell testing apparatus 100a includes a stage 110, a movable chuck 120, a light source 130, and a plurality of probes 140. The movable chuck 120 is disposed on the stage 110 to carry the sample sheet 200 and capable of driving the sample sheet 200 to achieve an one-dimensional motion, a two-dimensional motion or a three-dimensional motion relative to the stage 110. In more details, the sample sheet 200 can move relative to the stage 110 along upward/downward, leftward/rightward, or frontward/rearward direction. Furthermore, the sample sheet 200 can also achieve a planar motion in X-Y plane, X-Z plane or Y-Z plane, or move in X-Y-Z space. Additionally, the light source 130 is disposed above the stage 110, for providing testing light to the light incident side 210 of the sample sheet 200. In addition, the probes 140 are located below the rear side 220 of the sample sheet 200 and capable of testing the sample sheet 200 by contacting the electrodes 230 of the sample sheet 200. Therefore, the solar cell testing apparatus 100a of the present invention is capable of testing the superstrate type solar cell with the electrodes 230 located on the rear side 220.

Particularly, the solar cell testing apparatus 100a can further include a moving platform 150, a plurality of movable stations 160, and a mask 170. The moving platform 150 is disposed on the stage 110, the probes 140 are respectively carried on the moving platform 150 through the movable stations 160, and the movable stations 160 respectively drive the probes 140 to contact the electrodes 230. In other words, the movable stations 160 can drive the probes 140 to achieve an one-dimensional motion, a two-dimensional motion or a three-dimensional motion relative to the sample sheet, so as to drive the probes 140 to contact the electrodes 230 of the sample sheet 200 by adjusting a location of the probes 140 finely. Furthermore, the mask 170 is disposed on the light incident side 210 of the sample sheet 200, and the moving platform 150 drives the probes 140, the movable stations 160, and the mask 170 to move together relative to the sample sheet 200, wherein the moving platform 150 is capable of achieving an one-dimensional motion, a two-dimensional motion or a three-dimensional motion relative to the sample sheet 200.

In addition, the mask 170 further has an exposing hole 172, for exposing a partial area of the sample sheet 200, in which the partial area is, for example, one or a plurality of cell units. At this time, the testing light provided by the light source 130 is delivered to the light incident side 210 of the cell unit through the exposing hole 172, and the probes 140 are capable of testing the cell unit by contacting the electrodes 230 located on the rear side 220 of the cell unit.

In this embodiment, the solar cell testing apparatus 100a further includes a temperature control device 180, which is used for approximately maintaining an operating temperature of the sample sheet 200 at a particular temperature, for example, approximately 25° C., so as to ensure the precision of the testing data. The temperature control device 180 is disposed on the stage 110, and includes a temperature sensor 182 and a fan 184. The temperature sensor 182 is coupled to the sample sheet 200 for measuring the operating temperature of the sample sheet 200, and the fan 184 is disposed around the sample sheet 200 and coupled to the temperature sensor 182. In this embodiment, the moving platform 150 is, for example, a U-shaped platform, and thus has a notch 152, wherein the notch 152 is located below the sample sheet 200, and the fan 184 is disposed below the notch 152, such that a cooling air provided by the fan 184 can pass through the notch 152 to cool the sample sheet 200. A rotation speed of the fan 184 may be adjusted according to an operating temperature measured by the temperature sensor 182, so as to adjust the operating temperature of the sample sheet 200.

Figure 4:
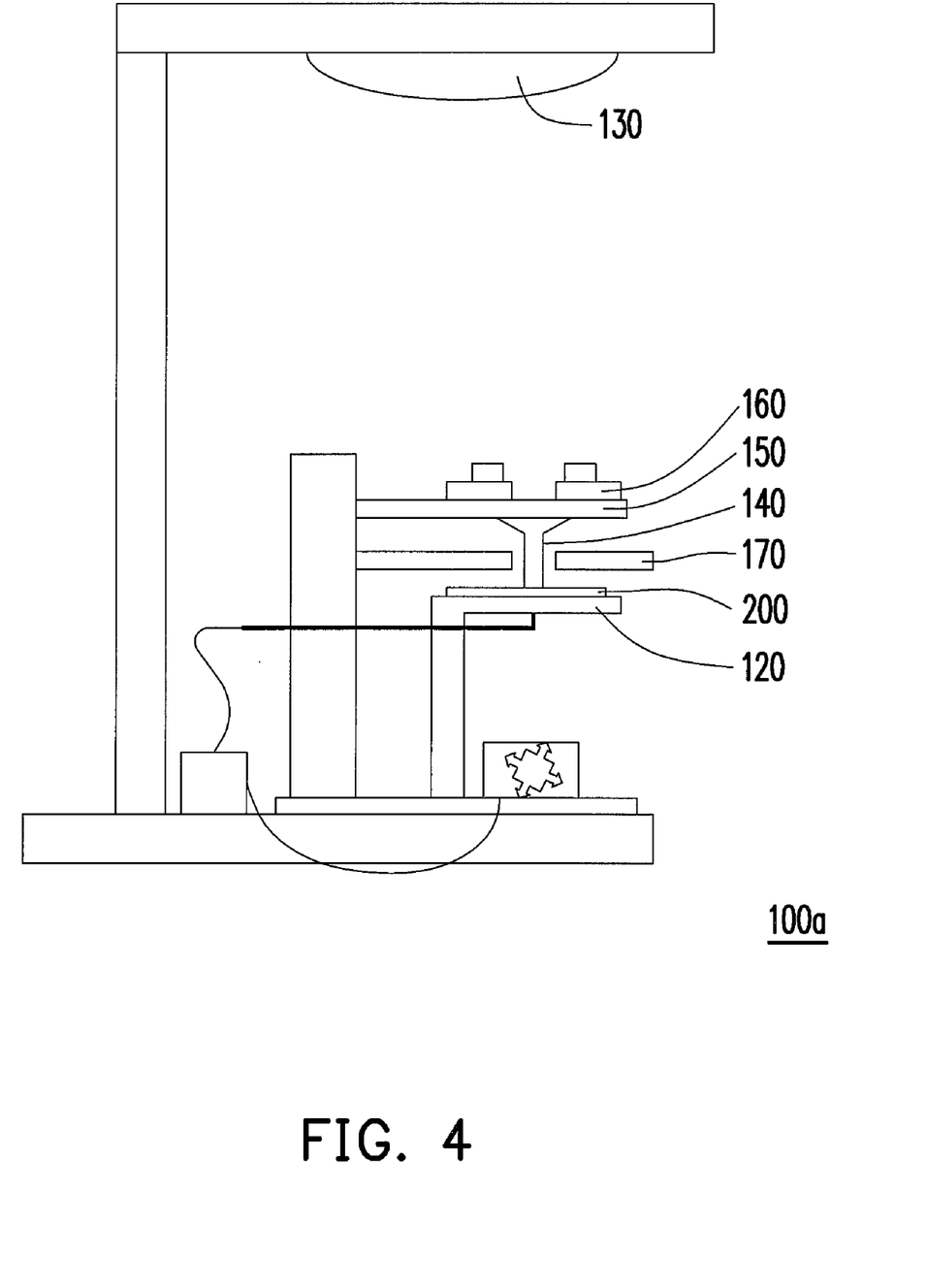
FIG. 4 is a schematic view of testing another sample sheet by the solar cell testing apparatus as shown in FIG. 1.

FIG. 4 is a schematic view of testing another sample sheet by the solar cell testing apparatus as shown in FIG. 1. FIG. 4' is a top view of FIG. 4. Referring to FIG. 4 and FIG. 4', not only the probes 140 is located below the movable chuck 120 and the rear side of the sample sheet 200, but also the moving platform 150 can drive the probes 140 and the movable stations 160 to move to a location above the movable chuck 120 and the light incident side of the sample sheet 200. Here, the probes 140 are coupled to the sample sheet 200 through the electrodes 230 at the light incident side of the sample sheet 200.

In other words, the solar cell testing apparatus 100a of the present invention not only can be used to test the superstrate type solar cell with the electrodes located on the rear side, but also can be used to test the substrate type solar cell with the electrodes located on the light incident side. It should be noted that, at this time, a portion of the moving platform 150 located above the exposing hole 172 of the mask 170 may not shield the testing light provided by the light source 130 due to the notch 152 of the moving platform 150.

Figure 5:
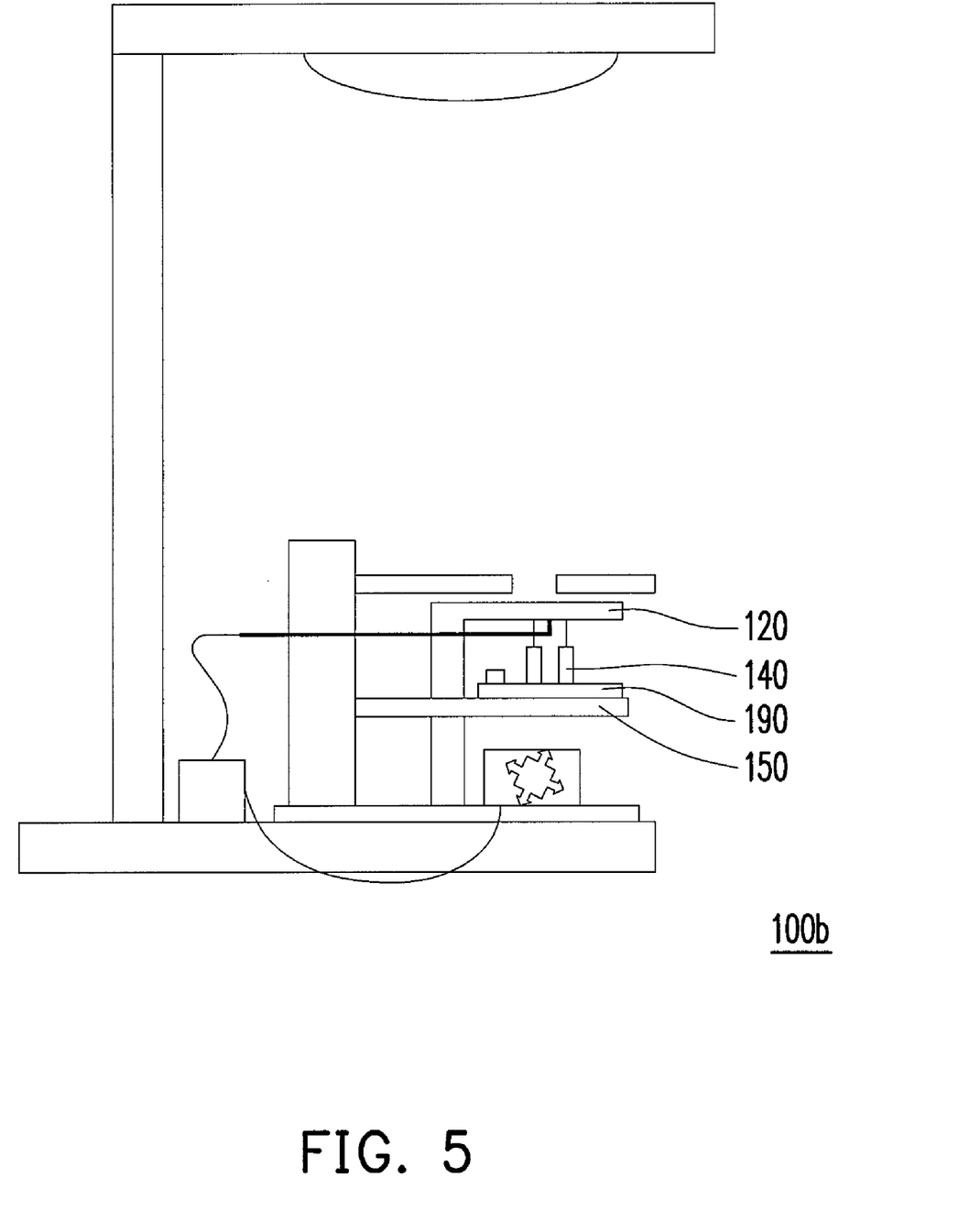
FIG. 5 is a schematic view of testing a sample sheet by a solar cell testing apparatus according to another embodiment of the present invention.
Figure 6:
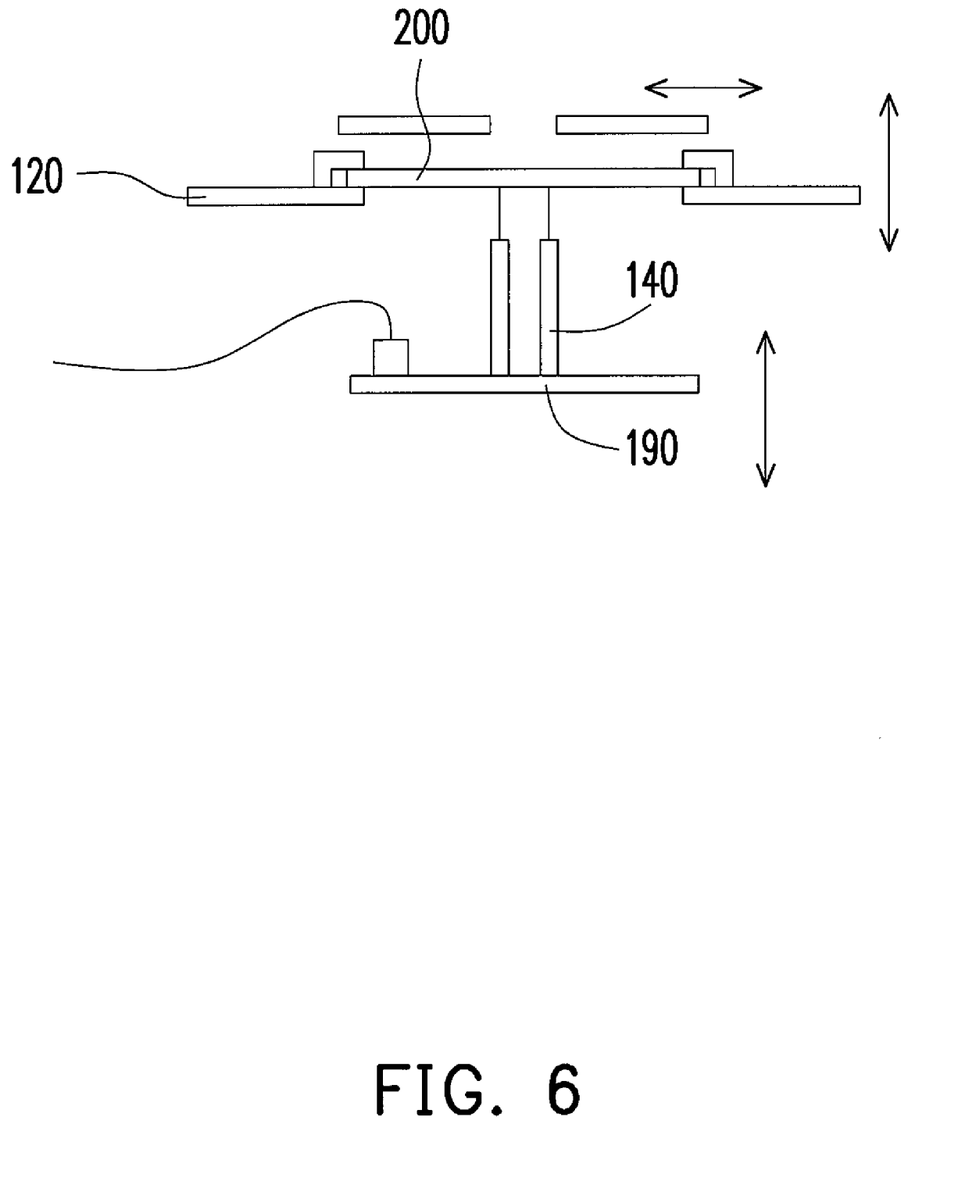
FIG. 6 is a right side view of FIG. 5.

FIG. 5 is a schematic view of testing a sample sheet by a solar cell testing apparatus according to another embodiment of the present invention, and FIG. 6 is a right side view of FIG. 5. Similarly, in order to simplify the drawing, the stage, the light source, and the temperature control device in FIG. 5 are omitted in FIG. 6, and the drawing is slightly enlarged.

Referring to FIGS. 5 and 6, a solar cell testing apparatus 100b in this embodiment is similar to the solar cell testing apparatus 100a in the previous embodiment, except that the probes 140 of the solar cell testing apparatus 100a in the previous embodiment are respectively carried on the moving platform 150 through the movable stations 160, but the probes 140 of the solar cell testing apparatus 100b in this embodiment are integrated on the same probe card 190 disposed on the moving platform 150.

In this embodiment, when the moving platform 150 moves towards the movable chuck 120 and the sample sheet 200, the moving platform 150 drives the probes 140 through the probe card 190 to contact the electrodes of the sample sheet 200 (not shown in FIGS. 5 and 6). In this manner, the operation flow of the solar cell testing apparatus 100b is simplified.

In summary, when the sample sheet is carried on the solar cell testing apparatus of the present invention, the light source is located on the light incident side of the sample sheet, and the probes are located on the rear side of the sample sheet and contact the plurality of electrodes located on the rear side. Therefore, the present invention can be used to test the superstrate type solar cell before the superstrate type solar cell is packaged.

Furthermore, in the present invention, the moving platform drives the probes and the movable stations to move to the location above the movable chuck and the light incident side of the sample sheet, such that the probes are coupled to the sample sheet from the light incident side of the sample sheet. Therefore, the present invention can also be used to test the substrate type solar cell.

In addition, the probes may also be integrated on the probe card, such that the moving platform drives the probes through the probe card to contact the electrodes of the sample sheet, when the moving platform moves towards the movable chuck and the sample sheet. In this manner, the operation flow of the solar cell testing apparatus is simplified.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A solar cell testing apparatus, comprising:
   a stage;
   a movable chuck, disposed on the stage, for carrying a sample sheet of solar cell to move relative to the stage, wherein the sample sheet of solar cell comprises a light incident side, a rear side opposite to the light incident side, and a plurality of electrodes disposed on the rear side;
   a light source, disposed above the stage, for providing testing light to the light incident side of the sample sheet of solar cell, the sample sheet of solar cell generating a current upon receiving the testing light, the movable chuck being located between the light source and the stage; and
   a plurality of probes, located on the rear side of the sample sheet of solar cell, for contacting the electrodes of the sample sheet of solar cell to receive the current.

2. The solar cell testing apparatus according to claim 1, wherein the sample sheet achieves a one-dimensional motion, a two-dimensional motion or a three-dimensional motion relative to the stage.

3. The solar cell testing apparatus according to claim 1, further comprising a moving platform, disposed on the stage, for carrying the probes to move relative to the sample sheet.

4. The solar cell testing apparatus according to claim 3, wherein the moving platform achieves a one-dimensional motion, a two-dimensional motion or a three-dimensional motion relative to the sample sheet.

5. The solar cell testing apparatus according to claim 3, further comprising a plurality of movable stations, wherein the probes are respectively disposed on the moving platform via the movable stations, so as to enable the probes to move relative to the moving platform.

6. The solar cell testing apparatus according to claim 5, wherein the movable stations achieve one-dimensional motions, two-dimensional motions or three-dimensional motions relative to the moving platform.

7. The solar cell testing apparatus according to claim 3, wherein the probes are integrated on a probe card disposed on the moving platform.

8. The solar cell testing apparatus according to claim 1, further comprising a mask, wherein the mask is disposed on the light incident side of the sample sheet, and a partial area of the sample sheet is exposed by the mask.

9. The solar cell testing apparatus according to claim 8, wherein the probes contact the electrodes corresponding to the partial area of the sample sheet exposed by the mask, and the mask and the probes are moved synchronously.

10. The solar cell testing apparatus according to claim 1, further comprising a temperature control device, disposed on the stage, for maintaining an operating temperature of the sample sheet.

11. The solar cell testing apparatus according to claim 10, wherein the temperature control device comprises:
   a temperature sensor, coupled to the sample sheet, for measuring an operating temperature of the sample sheet; and
   a fan, disposed around the sample sheet, coupled to the temperature sensor, for adjusting the operating temperature of the sample sheet according to an operating temperature measured by the temperature sensor.

12. A solar cell testing apparatus, comprising:
   a stage;
   a movable chuck, disposed on the stage, for carrying a sample sheet of solar cell to move relative to the stage, wherein the sample sheet of solar cell comprises a light incident side and a rear side opposite to each other;
   a light source, disposed above the stage, for providing testing light to the light incident side of the sample sheet of solar cell, the sample sheet of solar cell generating a current upon receiving the testing light, the movable chuck being located between the light source and the stage;
   a plurality of probes, coupled to the sample sheet of solar cell for receiving the current; and
   a moving platform, disposed on the stage, for carrying the probes to move to contact the sample sheet of solar cell from the light incident side or the rear side.

13. The solar cell testing apparatus according to claim 12, wherein the sample sheet achieves a one-dimensional motion, a two-dimensional motion or a three-dimensional motion relative to the stage.

14. The solar cell testing apparatus according to claim 12, wherein the moving platform achieves a one-dimensional motion, a two-dimensional motion or a three-dimensional motion relative to the sample sheet.

15. The solar cell testing apparatus according to claim 12, wherein the sample sheet comprises a plurality of electrodes on the rear side, and the probes are coupled to the sample sheet via the electrodes.

16. The solar cell testing apparatus according to claim 12, wherein the sample sheet comprises a plurality of electrodes on the light incident side, and the probes are coupled to the sample sheet via the electrodes.

17. The solar cell testing apparatus according to claim 12, further comprising a plurality of movable stations, wherein the probes are respectively disposed on the moving platform via the movable stations, so as to enable the probes to move relative to the moving platform.

18. The solar cell testing apparatus according to claim 17, wherein the movable stations achieve one-dimensional motions, two-dimensional motions or three-dimensional motions relative to the moving platform.

19. The solar cell testing apparatus according to claim 12, wherein the probes are integrated on a probe card disposed on the moving platform.

20. The solar cell testing apparatus according to claim 12, further comprising a mask, wherein the mask is disposed on the light incident side of the sample sheet, and a partial area of the sample sheet is exposed by the mask.

21. The solar cell testing apparatus according to claim 20, wherein the probes are coupled to the partial area of the sample sheet exposed by the mask, and the mask and the probes are moved synchronously.

22. The solar cell testing apparatus according to claim 12, further comprising a temperature control device, disposed on the stage, for maintaining an operating temperature of the sample sheet.

23. The solar cell testing apparatus according to claim 22, wherein the temperature control device comprises:
   a temperature sensor, coupled to the sample sheet, for measuring an operating temperature of the sample sheet; and
   a fan, disposed around the sample sheet, coupled to the temperature sensor, for adjusting the operating temperature of the sample sheet according to an operating temperature measured by the temperature sensor.

* * * * *